United States Patent
Rollick et al.

(10) Patent No.: US 7,780,869 B2
(45) Date of Patent: Aug. 24, 2010

(54) WATER ACTIVATED OXYGEN SCAVENGING COMPOSITION

(75) Inventors: Kevin L. Rollick, Munroe Falls, OH (US); Guliz Arf Elliott, Northfield Center, OH (US)

(73) Assignee: M&G USA Corporation, Apple Grove, WV (US)

( * ) Notice: Subject to any disclaimer, the term of this patent is extended or adjusted under 35 U.S.C. 154(b) by 1067 days.

(21) Appl. No.: 11/362,999

(22) Filed: Feb. 27, 2006

(65) Prior Publication Data

US 2006/0192176 A1    Aug. 31, 2006

Related U.S. Application Data

(60) Provisional application No. 60/657,237, filed on Feb. 28, 2005.

(51) Int. Cl.
*C09K 15/02* (2006.01)
*B01J 20/02* (2006.01)
*C01B 3/00* (2006.01)
*A62D 3/30* (2007.01)
*A62D 3/37* (2007.01)

(52) U.S. Cl. .................. 252/188.28; 252/181.26; 423/493; 423/658; 75/230; 75/246; 75/249; 75/366; 75/367

(58) Field of Classification Search .......... 252/188.28
See application file for complete search history.

(56) References Cited

U.S. PATENT DOCUMENTS

| | | | | |
|---|---|---|---|---|
| 2,880,062 A | * | 3/1959 | Francis | 423/147 |
| 3,165,374 A | * | 1/1965 | Hushebeck | 8/116.4 |
| 3,480,488 A | * | 11/1969 | Greendorfer et al. | 149/7 |
| 3,987,031 A | * | 10/1976 | Losel et al. | 536/6 |
| 4,021,478 A | * | 5/1977 | White | 562/496 |
| 4,230,595 A | * | 10/1980 | Yamaji et al. | 252/188.28 |
| 5,206,159 A | * | 4/1993 | Cohen et al. | 435/180 |
| 5,207,943 A | * | 5/1993 | Cullen et al. | 252/188.28 |
| 5,885,481 A | * | 3/1999 | Venkateshwaran et al. | 252/188.28 |
| 6,365,536 B1 | * | 4/2002 | Council et al. | 502/81 |
| 6,369,148 B2 | * | 4/2002 | Chiang et al. | 524/417 |
| 6,387,461 B1 | | 5/2002 | Ebner et al. | |
| 6,889,822 B1 | * | 5/2005 | Wagner et al. | 198/790 |
| 6,964,796 B1 | * | 11/2005 | Koyama et al. | 428/34.1 |
| 2001/0018480 A1 | | 8/2001 | Chiang et al. | |
| 2003/0203081 A1 | * | 10/2003 | Saari et al. | 426/133 |
| 2004/0094745 A1 | | 5/2004 | McKedy | |
| 2006/0069197 A1 | | 3/2006 | Tammaji et al. | |
| 2006/0208218 A1 | * | 9/2006 | Al Ghatta | 252/188.28 |
| 2007/0020456 A1 | * | 1/2007 | Solovyov | 428/403 |
| 2007/0200091 A1 | * | 8/2007 | Rollick | 252/188.28 |

FOREIGN PATENT DOCUMENTS

| | | |
|---|---|---|
| EP | 0466515 | 1/1992 |
| EP | 1050556 | 11/2000 |
| EP | 1506718 | 2/2005 |

\* cited by examiner

*Primary Examiner*—Joseph D Anthony
(74) *Attorney, Agent, or Firm*—Edwin A. Sisson, Attorney at Law, LLC

(57) ABSTRACT

An efficient oxygen scavenging composition for use in film forming polymers is disclosed wherein the oxygen scavenging composition comprises an oxidizable metal particle, such as elemental iron; a water hydrolysable Lewis acid, such as aluminum chloride; and an acidifying electrolyte such as sodium or potassium bisulfate.

13 Claims, No Drawings

WATER ACTIVATED OXYGEN SCAVENGING COMPOSITION

CROSS REFERENCES AND PRIORITY

This patent application claims the benefit of the priority of U.S. Provisional Patent Application Ser. No. 60/657,237 filed 28 Feb. 2005, the teachings of which are incorporated herein.

FIELD OF THE INVENTION

This invention relates to oxygen scavenging compositions and manufacturing methods thereof having utility in packaging. In particular, these compositions are suitable for being incorporated into film-forming polymers, subsequently used to make at least one layer of the wall of a container.

BACKGROUND OF THE INVENTION

Products sensitive to oxygen, particularly foods, beverages and medicines, deteriorate or spoil in the presence of oxygen. One approach to reducing these difficulties is to package such products in a container comprising at least one layer of a "passive" gas barrier film that acts as a physical barrier and reduces or eliminates the transmission of oxygen through the container wall but does not react with oxygen.

Another approach to achieving or maintaining a low oxygen environment inside a package is to use a packet containing a rapid oxygen absorbent material. The packet, also referred to as a pouch or sachet, is placed in the interior of the package along with the product. The oxygen absorbent material in the sachet protects the packaged product by reacting with the oxygen before the oxygen reacts with the packaged product.

Although oxygen absorbents or scavenger materials used in packets react chemically with the oxygen in the package, they do not prevent external oxygen from penetrating into the package. Therefore, it is common for packaging using such packets to include additional protection such as wrappings of passive barrier films of the type described above. Not only are sachets difficult to use with liquids, they add to product costs.

In view of the packet or sachet's disadvantages and limitations, it has been proposed to incorporate an "active" oxygen absorbent, i.e. one that reacts with oxygen, directly into the walls of a packaging article. Because such a packaging article is formulated to include a material that reacts with the oxygen permeating through its walls, the package is said to provide an "active-barrier" as distinguished from a passive barrier that merely blocks the transmission of oxygen but does not react with it. Active-barrier packaging is an attractive way to protect oxygen-sensitive products because it not only prevents oxygen from reaching the product from the outside, it can also absorb oxygen present within a container wall, and absorb the oxygen introduced during the filling of the container.

One approach for obtaining active-barrier packaging is to incorporate a mixture of an oxidizable metal (e.g., iron) and an activating composition which promotes the reaction of the metal with oxygen, often in the presence of water, into a suitable film-forming polymer. Examples of activating compositions are electrolytes (e.g., sodium chloride), acidifying components, electrolytic acidifying component, or protic solvent hydrolysable halogen compounds like Lewis acids (e.g. aluminum chloride). In the case of nano-metals, little or no activating composition may be needed due their inherent pyrophoricity. The scavenger containing film forming polymer is then melt processed into a monolayer or multilayer article such as a preform, bottle, sheet or film that eventually forms the resulting oxygen scavenger-containing wall or walls of the rigid or flexible container or other packaging article. It will be understood that a film-forming polymer is one that is capable of being made into a film or sheet. The present invention is not, however, limited to films and sheets. Examples of such film forming polymers are polyamides, polyethylenes, polypropylenes, and polyesters.

The container of the present invention also includes bottle walls, trays, container bases, or lids. It should be appreciated that references to the container sidewall and container wall also refer to the lid, bottom and top sides of the container, and a film that may be wrapped around the product such as meat wraps.

One difficulty with scavenger systems incorporating an oxidizable metal or metal compound and an electrolyte into a thermoplastic layer is the inefficiency of the oxidation reaction. High loading of scavenger compositions and relatively large amounts of electrolyte are often used to obtain sufficient oxygen absorption scavenging rate and capacity in active-barrier packaging.

According to U.S. Pat. No. 5,744,056, oxygen-scavenging compositions that exhibit improved oxygen-absorption efficiency relative to systems such as iron and sodium chloride are obtainable by including a non-electrolytic, acidifying component in the composition. In the presence of moisture, the combination of the electrolyte and the acidifying component promotes the reactivity of metal with oxygen to a greater extent than does either alone. However, the acidifying component when used alone does not exhibit sufficient oxygen-scavenging properties.

A particularly preferred oxygen-scavenging composition according to the U.S. Pat. No. 5,744,056 comprises iron powder, sodium chloride and sodium acid pyrophosphate, in amounts from about 10 to 150 parts by weight of sodium chloride plus sodium acid pyrophosphate per hundred parts by weight iron.

These conventional scavenging compositions are created by dry blending the ingredients or depositing the acidifying agents and salts onto the metal particle out of an aqueous liquid or slurry.

U.S. Pat. No. 5,744,056 teaches that the degree of mixing of the oxidizable metal, electrolyte and acidifying components and, if used, optional binder component has been found to affect oxygen absorption performance of the oxygen-scavenging compositions, with better mixing leading to better performance. Mixing effects are most noticeable at low electrolyte plus acidifying components to oxidizable metal component ratios and at very low and very high acidifying component to electrolyte component ratios. Below about 10 parts by weight electrolyte plus acidifying components per hundred parts by weight metal component, or when the weight ratio of either the electrolyte or acidifying component to the other is less than about 10:90, the oxygen scavenger components are preferably mixed by aqueous slurry mixing followed by oven drying and grinding into fine particles. Below these ratios, mixing by techniques suitable at higher ratios, such as by high-intensity powder mixing, as in a Henschel mixer or a Waring powder blender, or by lower intensity mixing techniques, as in a container on a roller or tumbler, may lead to variability in oxygen uptake, particularly when the compositions are incorporated into thermoplastic resins and used in melt processing operations. Other things being equal, U.S. Pat. No. 5,744,056 teaches that oxygen-scavenging compositions prepared by slurry mixing have the highest oxygen absorption efficiency or performance, followed in order by compositions prepared using high intensity solids mixers and roller/tumbler mixing techniques.

U.S. Pat. No. 4,127,503 teaches the dissolution of an electrolyte in water, contacting the solution with the oxidizable component (e.g. iron) and then removing the water from the composition. While this technique is suitable for salts which dissolve into water, it is not suitable for salts which hydrolyze in the presence of a protic solvent, such as water. Aluminum chloride for instance, will hydrolyze in the presence of water to hydrochloric acid and aluminum hydroxide.

PCT Application PCT/EP2004/008982 submitted on Aug. 11, 2004 teaches that certain protic solvent hydrolysable activating compositions can be placed onto the oxidizable component by dissolving the activating composition into an essentially moisture free organic solution, contacting the solution with the oxidizable metal then removing the solvent.

Japanese Application 10-131379, titled "Iron Powder For Reactive Material and Its Production" teaches placing an enveloping layer containing 0.1-2% of the weight of chlorine in the iron powder which the enveloping layer which becomes a front face of [sic] ferric chloride by contacting hot chlorine or hydrogen chloride gas to iron powder. This way the ferric chloride is made to form in the front face of said iron powder.

This vapor phase-solid phase reaction limits one to the reaction products of iron and various gasses. Because this particular disclosure requires that the oxidizing agent be a reaction product of iron, the practitioner is limited by the kinetics of the iron based salts and iron. Dissimilar metals such as aluminum chloride and iron are not available with this technique.

U.S. patent application Ser. No. 11/196,552 filed Aug. 3, 2005 teaches that the protic solvent hydrolysable activating composition can be deposited upon the oxidizable metal from the vapour stream.

U.S. Pat. No. 6,899,822 teaches the use of an acidifying electrolyte such as sodium bisulfate in the presence of sodium chloride and iron. In this case the electrolyte dissolves into the water as opposed to reacting or being hydrolyzed by the water into a different entity.

SUMMARY OF THE INVENTION

This invention discloses a composition wherein said oxygen scavenging composition comprises oxidizable metal particles and at least one water hydrolysable Lewis acid salt and/or its adducts, and at least one acidifying electrolyte. The water hydrolysable Lewis acid salts disclosed are those selected from the group consisting of $AlCl_3$, $AlBr_3$, $FeCl_2$, $FeCl_3$, $FeBr_2$, and $FeBr_3$. The acidifying electrolyte is selected from the group consisting of sulfamic acid, zinc sulfate, ferrous sulphate, potassium bisulfate, ammonium bisulfate, ammonium sulfite, ammonium bisulfite, sodium bisulfite and sodium bisulfate. Also disclosed is that the oxygen-scavenging composition preferably comprises iron. Also disclosed is a container comprising a film forming polymer, wherein said container has at least one wall, said wall comprising an effective amount of an oxygen-scavenging composition in the film forming polymer.

DETAILED DESCRIPTION OF THE INVENTION

The above deficiencies can be overcome according to the invention by providing an oxygen scavenging composition comprising an oxidizable component, preferably an oxidizable metal a reduced valence state such as iron, cobalt, aluminum, copper, zinc, manganese, and magnesium and an activating composition comprised of at least one protic solvent hydrolysable Lewis acid, and an acidifying electrolyte.

The activating composition promotes or initiates the reaction of the oxidizable component with oxygen. In the absence of the activating composition, there is little or no reaction of the oxidizable component with oxygen. The test therefore is whether the oxidizable metal reacts with more oxygen in the presence of the activating composition than when the activating component is absent. In the case of a triggerable system, such as requiring those requiring water, the rate of oxygen consumption of the composition comprising the activating composition, the oxidizable metal and water is compared with the rate of oxygen consumption of the oxidizable metal and water.

For clarity, the components of the activating composition need not be the actual compound that participates in or catalyzes the reaction with oxygen, but may participate in a reaction which produces a compound which does participate in or catalyze the reaction with water. While not to be bound by any mechanism, one hypothesis is that the aluminum chloride reacts with the water to form hydrochloric acid and it is the hydrochloric acid which actually sets up the galvanic cell. Another hypothesis is that the hydrochloric acid reacts to form iron chloride, which is a known activator of the reaction of oxygen with oxidizable metals.

It is therefore preferable that the activating composition initiate the reaction of the oxidizable metal in the presence of water. The phrase initiate the reaction of oxygen with the oxidizable metal means that when in the presence of water and the activating composition, the oxidizable metal becomes more reactive with oxygen than it would be in the presence of water without the activating composition.

For the reaction with oxygen to be initiated by water contact, it is essential that this composition promote the reaction in the presence of moisture. The moisture can come from direct contact with the liquid or absorption from the surrounding air or vapor. Requiring water is what makes the composition triggerable.

In a typical application, the water, the protic solvent, will come from the packaged goods, such as beer or juice. When the composition is bound in the walls of a container, the water migrates from the packaged goods to the composition initiating the reaction of the oxidizable component with the oxygen that passes from the outside of the wall to the inside.

To be triggerable, the activating composition should comprise an acidifying electrolyte and protic solvent (e.g. water) hydrolysable compounds, such as a Lewis acid. Of the protic solvent hydrolysable compounds, those with halogens such as chlorine and bromine are preferred. Again, the activating composition increases the reaction rate of the oxidizable component with oxygen.

The ability of the activating composition to initiate the oxygen scavenging reaction depends upon the acidity and electrolytic strengths of the products of the hydrolyzation. For example, it is believed that when sufficient water contacts the $AlCl_3$/iron particle, the $AlCl_3$ hydrolyzes to $Al(OH)_3$ and HCl. The HCl is a strong acid and electrolyte which promotes the rapid and efficient reaction of the iron with oxygen. Whether the activating composition remains in the system after exposure to water or is converted to another compound is irrelevant. It is the starting composition that is claimed in this invention.

U.S. Pat. No. 5,885,481, the teachings of which are incorporated by reference herein, teaches the advantages of using a non-halogenated acidifying electrolytic component.

Many protic solvent hydrolysable compounds such as titanium tetrachloride, tin tetrachloride, and $POCl_3$, $SOCl_2$, $SCl_2$, $S_2Cl_2$, $PCl_3$, $PSCl_3$, $PBr_3$, $POBr_3$, $PSBr_3$, $PCl_5$, $PBr_5$, $SiCl_4$, $GeCl_4$, $SbCl_5$ are liquids at room temperature and readily boil. Other protic solvent hydrolysable compounds such as $AlCl_3$, $FeCl_2$, $FeCl_3$, $AlBr_3$, $SbCl_3$, $SbBr_3$, and $ZrCl_4$ sublime at relatively low temperatures.

Preferred protic solvent hydrolysable halogen compounds are the halides, in particular chloride and bromide, more preferably $AlCl_3$, $AlBr_3$, $FeCl_2$ $FeCl_3$, $FeBr_2$, $FeBr_3$, $TiCl_4$, $SnCl_4$, and $POCl_3$.

A preferred embodiment of this composition is to use the various deposition techniques to create a unitary particle of the composition. For example, as described in U.S. Provisional Patent Application Ser. No. 60/601,268 filed 13 Aug., 2004 and United States Nonprovisional patent application Ser. No. 11/196,552 filed 3 Aug. 2005, both of whose teachings are incorporated in their entirety, one component of the activating composition could be deposited onto the oxidizable component from the vapour phase. Aluminum chloride could also be deposited from an organic solvent, such as ethanol. Aluminum chloride is the preferred water hydrolysable Lewis acid in the amount deposited on the elemental iron ranging from 10 to 400 parts aluminum chloride to 1000 parts elemental iron. For the vapour deposited aluminum chloride, 50-100 parts of aluminum chloride per 1000 parts elemental iron was determined to be optimum.

The amount of aluminum chloride is expected to be higher for dry blends of activating composition with iron.

For either the deposition process or the dry blend, the preferred amounts of the protic solvent hydrolysable Lewis acid is in the range of between the molar equivalent of 5 percent by weight aluminum chloride to the molar equivalent of 40 percent by weight aluminum chloride relative to the weight of the aluminum chloride plus iron. The preferred amounts of the acidifying electrolyte is in the range of between the molar equivalent of 5 percent by weight sodium bisulfate to the molar equivalent of 17 percent by weight sodium bisulfate relative to the weight of the sodium bisulfate plus iron.

As described in U.S. Provisional Patent Application Ser. No. 60/601,268 and U.S. Nonprovisional patent application Ser. No. 11/196,552 filed 3 Aug. 2005, the vapour deposition process requires two quasi-unit operations. The first unit operation, or step, is contacting the oxidizable component with the vapour phase containing at least one component of the activating composition. The next unit operation, or second step, is the vapour deposition wherein the component of the activating composition is condensed or de-sublimed as a liquid or solid onto the oxidizable component.

In general, one component of the activating composition is placed into a vapor stream by either boiling, flashing or subliming the activating composition by manipulating temperature and/or pressure. The vaporized activating composition is contacted with the oxidizable particles and once in contact with the oxidizable particle, the activating composition is deposited from the vapour stream onto the oxidizable component through condensation or de-sublimation.

It should be noted that the process is best carried out in an oxygen and moisture free environment. Also, because of the intimacy of contact, the required amount of activating composition is substantially less than prior art indications. The desired ratio of activating composition to oxidizable component can readily be determined by trial and error without undue experimentation. One merely makes various particles with differing levels of the activating composition and ratios analyzes the results and increases or decreases the amount of components in the activating composition to achieve the desired oxygen scavenging activity.

It is also noted that the oxidizable component could be several compounds, or alloys of compounds. Additionally, the activating composition is also not limited to just one compound. Additional agents such as binders and water absorbers can be placed on the oxidizable particle first and the particle subjected to vapor deposition.

One variation is to add the acidifying electrolyte (e.g. sodium or potassium bisulfate ($NaHSO_4$, $KHSO_4$)) to the oxidizable particle, prior to depositing the protic solvent hydrolysable Lewis acid. It has been discovered that $NaHSO_4$ added to the iron/aluminum chloride system greatly enhances the reactivity with oxygen. Since sodium bisulfate is the reaction product of sulphuric acid and sodium hydroxide one could react sulphuric acid with sodium hydroxide in the presence of particles of the oxidizable component, remove the water, and the oxidizable particles have been deposited with sodium bisulfate. The resulting oxidizable component/sodium bisulfate particle is then further processed by having aluminum chloride deposited upon it from the vapour phase as described below.

The above process works with any acidifying electrolyte since by definition an acidifying electrolyte comprises at least one solid compound that produces an acidic pH, i.e., less than 7, in dilute aqueous solution and substantially disassociates into positive and negative ions in the presence of moisture and promotes reactivity of the oxidizable component with oxygen. Like the oxidizable metal component, the acidifying electrolyte component should be capable of being used in packaging without adversely affecting products to be packaged. For applications in which the invented compositions include or are used with a thermoplastic resin, the component also should have sufficient thermal stability to withstand melt compounding and processing. Suitable materials include various electrolytic inorganic acids and their salts. Examples of particular compounds include sulfamic acid, zinc sulfate, ferrous sulphate, sodium bisulfate, potassium bisulfate, ammonium bisulfate, ammonium sulfite, ammonium bisulfite, and sodium bisulfite. Combinations of such materials also can be used. A particularly effective acidifying electrolyte compound of this invention is one in which the sole or predominant acidifying electrolyte component is sodium bisulfate.

Once the composition is created it can be dispersed into a film forming polymer matrix. After dispersion of the vapour deposited oxygen scavenging particle into the polymer matrix, every polymer void or capsule containing a particle with the oxidizable component will also contain an activating composition. In contrast, when a dry blend of the activating and oxidizable components is incorporated into the polymer matrix the separate particles are often not in the same vicinity and the polymer separating the salt from the iron creates a barrier that renders the particle virtually ineffective as an oxygen scavenger. However, the dry blend of the oxidizable component, and activating composition comprising a protic solvent Lewis acid and acidifying electrolyte is considered part of this invention.

The oxidizable particles preferably have an average particle size less than 50 μm, with less than 45 μm, even more preferred, and less than 32 μm more preferred and less than 25 μm, the most preferred.

Iron is the preferred metal based upon cost. While the electrolytic reduced unannealed or annealed iron is preferred, carbonyl iron and carbon monoxide or hydrogen reduced sponge irons are also suitable. It should be noted that hydrogen and carbon monoxide reduced forms of iron are generally less reactive than the electrolytic reduced iron. It is also not necessary for the oxidizable component to be in elemental (0 valent state) form. For example, compounds with Fe (II) are considered part of this invention.

While iron is the preferred oxidizable component for cost reasons, cobalt, tin, copper, magnesium, manganese, aluminum and zinc are all candidates for the process of this invention.

The oxidizable component, particularly the metals, does not need to be 100% pure. Minor alloying elements such as nickel, chromium, silicon and other compounds can be present. Using iron as an example, the mixtures of iron with minor amounts of other metals can be used. The iron based scavenging compositions are incorporated into the wall of a container made from film-forming polymers, preferably aromatic polyester, in amounts from 500 to 10000 parts by weight per million parts by weight polymer, preferably 1000 to 6000 parts per million parts polymer. For aesthetic reasons, the maximum allowable amount may be 3500 to 5000 parts scavenging composition per million parts film-forming polymer. In the case of nano-scale scavengers, 200-2000 ppm may be sufficient. When used in non-transparent packaging, the amounts of scavenging composition can go as high as 5 weight percent of the total polymer plus scavenging composition (95 grams polymer, 5 grams scavenging composition).

Of the film forming polymers, polyester is preferred. Other examples of film forming polymers are the polyamides, the polypropylenes, polyethylenes, and polyvinyl chlorides. Suitable polyesters include those produced from aromatic, aliphatic or cycloaliphatic dicarboxylic acids of from 4 to about 40 carbon atoms and aliphatic or alicyclic glycols having from 2 to about 24 carbon atoms.

A film forming polymer is a polymer whose melt viscosity is equal to or greater than the melt viscosity of polyethylene terephthalate having an intrinsic viscosity of 0.45 dl/g, an intermediate feed I.V. of 0.49 to 0.59 dl/g, or more preferably 0.52 to 0.56 dl/g.

The polymer could be a polyester bottle resin of feed I.V. ranging from 0.59 to 0.69 dl/g, more preferably 0.61 to 0.64 dl/g, with a typical I.V. for bottles ranging from 0.72 to 0.84 dl/g, more preferably 0.74 to 0.82 dl/g. For packaging trays the typical I.V. ranges from 0.60 to 1.50 dl/g, more preferably from 0.89 to 0.95 dl/g. It is noted that while the measured I.V. of a polymer is a single value, that value represents the composite of the various molecule chain lengths Polyesters employed in the present invention can be prepared by conventional polymerization procedures well known in the art. The polyester polymers and copolymers may be prepared, for example, by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers.

As noted hereinabove, suitable dicarboxylic acids include those comprising from about 4 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, the various isomeric phthalic and naphthalic diesters.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to ethylene glycol, 1,4-butenediol, trimethylene glycol, 1,6-hexanediol, 1,4-cyclohexanedimethanol, diethylene glycol, resorcinol ethoxy ethyl ether, and hydroquinone ethoxy ethyl ether.

Polyfunctional comonomers can also be used, typically in amounts of from about 0.05 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

One preferred polyester is polyethylene terephthalate (PET) formed from the approximate 1:1 stoichiometric reaction of terephthalic acid, or its ester, with ethylene glycol. Another preferred polyester is polyethylene naphthalate (PEN) formed from the approximate 1:1 to 1:1.6 stoichiometric reaction of naphthalene dicarboxylic acid, or its ester, with ethylene glycol. Yet another preferred polyester is polybutylene terephthalate (PBT). Copolymers of PET, copolymers of PEN, and copolymers of PBT are also preferred. Specific copolymers and terpolymers of interest are PET with combinations of isophthalic acid or its diester, 2,6 naphthalic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred. Another preferred polyester is poly-trimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Isophthalic acid and sebacic acid are an example of simultaneously using an aromatic and aliphatic acid to make a copolymer.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polymer using this invention may also contain small amounts of phosphorous compounds, such as in the form of phosphate or phosphate, and a catalyst such as a cobalt compound, that tends to impart a blue hue.

The melt phase polymerization described above may be followed by a crystallization step, then a solid phase polymerization (SSP) step to achieve the intrinsic viscosity necessary for the manufacture of certain articles such as bottles. The crystallization and polymerization can be performed in a tumbler dryer reaction in a batch-type system.

In many cases, it is advantageous to incorporate the scavenger immediately following the melt polymerization step and subjecting the polymer containing the scavenger to the solid phase polymerization.

Alternatively, the crystallization and polymerization can be accomplished in a continuous solid state process whereby the polymer flows from one vessel to another after its predetermined treatment in each vessel. The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may be carried out for a time sufficient to raise the intrinsic viscosity to the desired level, which will depend upon the application. For a typical bottle application, the preferred intrinsic viscosity is from about 0.65 to about 1.0 deciliter/gram, as determined by ASTM D-4603-86 at 30° C. in a 60/40 by weight mixture of phenol and tetrachloroethane. The time required to reach this viscosity may range from about 8 to about 21 hours.

In one embodiment of the invention, the film-forming polymer of the present invention may comprise recycled polymers, such as post-consumer or post-industrial polyester or materials derived from recycled polyester, such as polyester monomers, catalysts, and oligomers. Examples of other film-forming polymers include polyamides, polycarbonate, PVC and polyolefins such as polyethylene and polypropylene.

The oxygen-scavenging compositions can be added directly to the thermoplastic polymer compounding or melt-fabrication operation, such as the extrusion section thereof, after which the molten mixture can be advanced directly to the article-fabrication line.

Alternatively, the compositions can be compounded into masterbatch concentrate pellets, which can be further incorporated into packaging polymers for further processing into the desired article.

The concentrates in polyester resins preferably contain more than 20 parts of oxygen-scavenging composition per hundred parts of resin, but the concentrates could contain as low as 5 to 10 parts per hundred. Containers having at least one wall incorporating the oxygen-scavengers of the present invention are the preferred articles. Cups, pouches, boxes, bottles, lids and wrapped films are also examples of such walls. Stretched and unstretched films are included in the definition of container walls.

It is also contemplated to provide articles, with both active and passive oxygen barrier properties through use of one or more passive gas barrier layers in conjunction with one or more layers according to the invention. Alternatively, the passive barrier and oxygen scavenging composition may both be in the same layer.

Thus for products calling for long shelf-life, an oxygen scavenging layer according the present invention can be used in conjunction with a passive gas barrier layer.

Another advantage of the claimed particles and of the polymers and manufactured articles into which they are incorporated is their storage stability i.e. their lack of reactivity in the absence of humidity, which permits long storage periods before filling.

Many polymers are transparent, but polymers that are transparent to visible light may become opaque, as the result of the presence of additives such as fillers, scavengers, stabilizers, and similar additives. The opacity results from light-scattering occurring within the material.

As indicated, the containers comprising at least one wall incorporating the oxygen scavengers of the present invention do not present as large a bloom as do conventional scavengers upon aging.

The microscope observation of the wall upon aging shows a limited number of black dots uniformly distributed within the wall; the wall area occupied by the dots is a small fraction of the total area. By contrast, the wall of the containers incorporating prior art oxygen-scavengers show marked visual dots due to the formation of large blooms distributed along the wall. Conventional scavengers also show a yellow/orange coloration. The compositions listed in the examples showed a darkening of the container wall, but no yellow/orange shift in color.

The color parameters of the wall of the containers of the present invention show a small decrease of the minus $a^*$ values and plus $b^*$ values referred to the $a^*$ and $b^*$ values of the wall not containing scavengers, whereas the walls incorporating prior art scavengers show plus $a^*$ values and increased plus $b^*$ values.

Preferred wall-containers are stretched bottles with a thickness from about 280 to 410 μm and haze values of about 1% or less per mil thickness. Note that all bottle sidewalls used in the examples fall within the thickness noted.

The following examples are provided for purpose of illustrating the manufacture of the composition and the composition properties and are not intended to limit the scope of the invention.

Standard Evaluation Procedure.

Each series of scavenging particles was evaluated for oxygen scavenging and bottle aesthetics in the following manner: Unless otherwise indicated, the scavenging particles were dispersed into the polymer matrix and injection molded into either 52 gram or 27 gram preforms by mixing 6 gms of the oxygen scavenging particles with 1994 gms of a commercially available PET co-polyester (8006S supplied by M&G Polymers USA, LLC) which had been previously dried overnight in a vacuum oven at 150° C. in a can. The physical mixture was then charged to an injection molding machine which melted the polymer and dispersed the particles into the preforms. After being aged for one day, the preforms were blown into 2 Liter or 600 ml, bottles, respectively. In the case of the nano-scale scavenging particles, 1000 ppm of the scavenging particles were added to the polymer.

Panels were cut from the walls of the bottles and analyzed for oxygen scavenging capability using the accelerated oxygen scavenging test method described in the methods section. The oxygen data is listed in Table I and demonstrates the high degree of scavenging and the triggerable nature of the scavenger. Table II lists the bottle aesthetics of haze, $L^*$, $a^*$ and $b^*$.

EXAMPLE I

Iron Chloride with NaHSO$_4$

A fluidized sand bath was set at the desired temperature and allowed to equilibrate. An HCl generator was made using a 2-neck round bottom flask fitted with an equilibrated addition funnel and a nitrogen inlet and outlet. 17.6 g NaCl (Aldrich reagent) was charged to the flask and 39.2 g $H_2SO_4$ (Fisher reagent, 96%) charged to the addition funnel. The outlet of the HCl generator flask was connected to a Pyrex tube inserted into the sand bath The nitrogen entering the bottom of the bed was first passed thru several wraps of tubing around the outside of the Pyrex tube which allowed the nitrogen with HCl gas to pass through sand bath and become preheated. The Pyrex fluidized bed was charged with 117.2 g iron powder (Hoganas, North America XCS-50) and the entire system purged with $N_2$. After 30 minutes, the nitrogen flow thru the system was adjusted to just fluidize the iron bed.

Addition of $H_2SO_4$ to the NaCl was carried out dropwise over 1.5-2 hrs and the resulting mixture is then heated to about 100° C. for an additional 1 hr to drive the HCl generation. The heat was then removed from the HCl generator, the Pyrex fluidized bed raised out of the sand bath and allowed to cool under $N_2$ flow and the iron coated with iron chloride made from the reaction of HCl with iron was discharged into a tared, $N_2$ flushed jar, capped and stored in a glove bag.

Three samples labelled Ia, Ib, and Ic were manufactured as described, the difference being the temperature of the sand bath housing the Pyrex fluidized bed. The temperatures used were 425° C., 500° C. and 350° C. respectively. 3000 ppm of the composition was melt mixed into polyester and blown into bottles.

EXAMPLE II

Fe/HCL ($FeCl_2$) (Ia) Plus Acidifying Electrolyte

Sample Ia was dry blended with 3 w/w % by weight with $NaHSO_4$ and made into a bottle sidewall with 3000 ppm of the total composition. The data in Table I show 1.4 times more oxygen reactivity than Ia.

EXAMPLE III $Fe^0/AlCl_3$ in a Sealed Vessel

A 50 mL Erlenmeyer flask with a screw cap was dried at 150° C. and cooled to room temperature. 2.5 gms (0.019 mol) of anhydrous $AlCl_3$ (Aldrich, sublimation temperature 178° C.) and 100 gm (1.8 mol) reduced −20 micron iron powder were placed into the flask. The −20 micron powder was obtained by sieving grade EA-230 electrolytically reduced iron metal powder (available form OMG, now North American Hoganas). The flask containing the $AlCl_3$ and iron was capped and shaken to mix the ingredients. The $AlCl_3$ was vaporized and brought in contact with the iron by placing the flask in a fluidized sand bath at 175° C. for 3 hrs, removing the flask every 30-60 minutes to break up the loosely agglomerated mass. The $AlCl_3$ was deposited onto the iron by cooling the flask to room temperature under nitrogen. The resulting particles were broken up and crushed. Analysis showed 2.02% total choride on the particles.

In this evaluation 4 gms of particles were dispersed into 1996 gms copolyester and the resulting bottle was a heat set panelled bottle. Bottles were also compounded with 2000 ppm of the particles and 5% MXD6 6001 Nylon from Mitsibushi Gas Chemical. No accelerated oxygen test was run on these bottles.

EXAMPLE IV $Fe^0$/5% $AlCl_3$ in a Fluidized Bed

The tubular fluidized bed reactor was charged with 5.45 Kgs of EA-230 electrolytic iron powder (available from OMG, now North American Hoganas, USA) sieved to −20 micron. A vaporizer vessel containing 272.6 gms $AlCl_3$ (Aldrich, USA) and was placed in a sand bath at 225° C. Hot nitrogen was passed through the $AlCl_3$ gas, taken out the top of the vaporizer and piped thru a traced, insulated transfer line to the tubular fluidized bed reactor containing the fluidized iron. The gaseous stream of $AlCl_3$ was brought in contact with the iron by introducing the gas into the tubular reactor just above the nitrogen distributor plate. The process was carried out for 15 minutes past the time at which the temperature immediately above the distributor plate in the vaporizer reached that of the top of the vaporizer. The deposition of the $AlCl_3$ on the iron was evident as the temperature of the iron increased to 57° C. The heat and nitrogen to the vaporizer were then turned off and the materials in the fluidized bed began to cool. When the iron cooled to below 45° C. it was discharged. On opening the vaporizer, essentially no $AlCl_3$ remained. Further, no evidence of $AlCl_3$ was observed on the upper part of the iron containing reactor.

EXAMPLE VIa

Blended $Fe^0/AlCl_3$ Comparison

Under a nitrogen atmosphere, aluminium chloride powder was added directly to electrolytic iron powder at 2.5 w/w % and 10 w/w % weight based on the weight of iron and blended for two hours at room temperature on a roller mill. These were labelled 6A and 6B, respectively. 2 Liter bottles were made and sidewalls properties measured. The Hunter haze for the 10% blend at 3000 ppm iron was 53% and well above any commercially acceptable criteria for a transparent bottle.

EXAMPLE VIb

Comparison

A dry blend of 3000 ppm weight of Freshblend™ Scavenger from Multisorb Technologies, Buffalo, N.Y. USA was injection molded with PET into a 52.5 gram preform (Series 267) and made into a bottle (See "Multiple Functionality Sorbents", Calvo, William D. Proceedings of ACTIVEPack Conference, p9 (2003) (announcing the commercialisation of Freshblend™ for polyester). The sidewall was subjected to the accelerated oxygen absorbance test (0.11 $cm^3$ $O_2$/g polymer/1000 ppm Fe). While the compositions had comparable oxygen scavenger absorbance, size of the blooms is significantly smaller for Example 1, the subject of the current invention.

EXAMPLES VIc AND VId

Other Blend Comparisons

Compositions were made blending iron with NaCl (8 w/w % weight based on weight of iron) and blending iron with $NaHSO_4$ (10 w/w % weight based on weight of iron as described in U.S. Pat. No. 5,885,481, the teachings of which are incorporated in their entirety). These blends were prepared by adding the appropriate salt directly into the iron powder and then mechanically blending of the mixture in a rotary mill. These two compositions are labelled VIc and VId respectively and were converted into 2 Liter bottles containing 4000 ppm of either blend. They were converted into bottles by mixing the respective blend with PET, injection blow molding 52.5 g preforms, and blowing the preforms into 2 liter bottles.

EXAMPLE SERIES VIII

Vapor Deposition Plus Additional Acidifying Electrolyte

All the examples started with 4.5 micron carbonyl iron particles. Aluminum chloride had been deposited upon the iron particles in the ratio of 8 parts per 100 parts iron (8 w/w % $AlCl_3$). Example VIIIa is the control sample with no additional materials added to the composition. Example VIIIb is a comparative example (labelled Example VIIIa+12 w/w % $AlCl_3$) is the composition of VIIIa to which 12 w/w % $AlCl_3$ was added in dry blended form. Working Example VIIIc (labelled Example VIIIa+10% $NaHSO_4$) is the composition of VIIIa to which 10 w/w % sodium bisulfate ($NaHSO_4$) was added.

Each composition was added to dried bottle grade polyethylene terephthalate at a level of 2000 ppm iron per amount of polyethylene terephthalate and injection molded into a preform. The preform was subsequently reheat blown into a bottle and the oxygen efficiency of the composition in the polymer measured according to the accelerated oxygen absorbance test described in the test method section.

It is readily seen that after 5 days, the material with 10% $NaHSO_4$ had reacted with 50% more oxygen than the material with 12% $AlCl_3$ after 7 days. This establishes the superiority of the combination over just adding more $AlCl_3$.

EXAMPLE SERIES IX

Different Levels of Acidifying Electrolytes

Series IX used iron with 10 w/w % aluminum chloride deposited and added 17 w/w %, 10 w/w %, and 5 w/w % of $NaHSO_4$ to the $Fe/AlCl_3$ composition. Each sample was labelled IXa, IXb, and IXc respectively. Differing amounts were added into the PET but the normalized data all demonstrate a large amount of oxygen scavenging.

EXAMPLE SERIES X

Different Acidifying Electrolytes

In this series, different acidifying electrolytes were added to the composition of −20 micron electrolytic iron with 10 w/w % aluminum chloride deposited on it. 10 w/w % of $NH_4HSO_4$, $NaHSO_3$ and $(NH_4)_2SO_3$ of the aluminum chloride/iron mixture were added to the aluminum chloride/iron composition and labelled Xa, Xb, and Xc. The compositions were added to polyester and made into bottles and subjected to the oxygen scavenging test. The results are in Table I.

TABLE I

Oxygen Scavenging Performance

| Ex. | Description | Days of ageing in G.C. vial | Dry Reactivity (ccO2 per gram polymer) | Wet Reactivity (ccO2 per gram polymer) | Wet Reactivity (ccO2 per gram polymer per 1000 ppm Scavenging composition) |
|---|---|---|---|---|---|
| Ia | Fe/HCl @425° C. | 4 | | 0.091 | 0.030 |
| Ib | Fe/HCl @500° C. | 4 | | 0.080 | 0.027 |
| Ic | Fe/HCl @350° C. | 4 | | 0.050 | 0.017 |
| II | Fe/HCl from Ia + 3% $NaHSO_4$ dry blend | 4 | | 0.146 | 0.049 |
| IV | Fe⁰/5% $AlCl_3$ in a fluidized bed | 4 | 0.016 | 0.18 | 0.06 |
| | | 10 | 0.020 | 0.28 | 0.093 |
| VIa | 2.5 wt % $AlCl_3$ Dry Blend, 3000 ppm in PET | 3 | | 0.07 | 0.023 |
| VIb | 3000 ppm Freshblend ™ in PET | 10 | | 0.34 | 0.113 |
| VIc | 8 Wt % NaCl on Fe, blended at 4000 ppm in PET | 10 | | 0.19 | 0.048 |
| VId | 10 Wt % $NaHSO_4$ on Fe, blended at 4000 ppm in PET | 10 | | 0.34 | 0.085 |
| VIIIa | Fe + 8 w/w % deposited $AlCl_3$ | 5 | | | 0.104 |
| VIIIb | Example VIIIa + 12% AlCl3 | 7 | | | 0.190 |
| VIIIc | Example VIIa + 10% $NaHSO_4$ | 5 | | | 0.235 |
| IXa | Fe⁰/10% $AlCl_3$ in a fluidized bed | 1 | 0.011 | 0.084 | 0.042 |
| | | 3 | 0.035 | 0.210 | 0.105 |
| | | 7 | 0.026 | 0.252 | 0.126 |
| | | 10 | 0.034 | 0.262 | 0.131 |
| IXb | Fe⁰/10% $AlCl_3$ in a fluidized bed with 17% $NaHSO_4$ added via dry blend (1200 ppm in PET) | 1 | 0.016 | 0.095 | 0.079 |
| | | 3 | 0.017 | 0.160 | 0.133 |
| | | 7 | 0.029 | 0.224 | 0.187 |
| | | 10 | 0.032 | 0.234 | 0.195 |
| IXc | Fe⁰/10% $AlCl_3$ in a fluidized bed with 10% $NaHSO_4$ added via dry blend (2000 ppm in PET) | 1 | 0.017 | 0.114 | 0.057 |
| | | 3 | 0.016 | 0.215 | 0.107 |
| | | 7 | 0.027 | 0.331 | 0.165 |
| | | 10 | 0.033 | 0.382 | 0.191 |

TABLE I-continued

Oxygen Scavenging Performance

| Ex. | Description | Days of ageing in G.C. vial | Dry Reactivity (ccO2 per gram polymer) | Wet Reactivity (ccO2 per gram polymer) | Wet Reactivity (ccO2 per gram polymer per 1000 ppm Scavenging composition) |
|---|---|---|---|---|---|
| IXd | $Fe^0$/10% $AlCl_3$ in a fluidized bed with 5% $NaHSO_4$ added via dry blend (3000 ppm in PET) | 1<br>3<br>7<br>10 | 0.021<br>0.017<br>0.030<br>0.032 | 0.141<br>0.263<br>0.431<br>0.507 | 0.047<br>0.088<br>0.144<br>0.169 |
| Xa | $Fe^0$/10% $AlCl_3$ in a fluidized bed with 10 w/w % $NH_4HSO_4$ added via dry blend (2000 ppm in PET) | 1<br>3<br>7<br>10 | | 0.084<br>0.182<br>0.265<br>0.348 | 0.042<br>0.091<br>0.133<br>0.174 |
| Xb | $Fe^0$/10% $AlCl_3$ in a fluidized bed with 10 w/w % $NaHSO_3$ added via dry blend (2000 ppm in PET) | 1<br>3<br>7<br>10 | | 0.090<br>0.194<br>0.298<br>0.354 | 0.045<br>0.097<br>0.149<br>0.177 |
| Xc | $Fe^0$/10% $AlCl_3$ in a fluidized bed with 10 w/w % $(NH_4)_2SO_3$ added via dry blend (2000 ppm in PET) | 1<br>3<br>7<br>10 | | 0.072<br>0.159<br>0.234<br>0.312 | 0.036<br>0.080<br>0.117<br>0.156 |

TABLE III

PET Bottle Sidewalls

| Example and label | $O_2$ reacted in 5 days cc $O_2$/gmPET/ 1000 ppm Fe | $O_2$ reacted in 7 days cc $O_2$/gmPET/ 1000 ppm Fe |
|---|---|---|
| VIIIa | 0.104 | |
| Example VIIIa + 12% $AlCl_3$ | | 0.19 |
| Example VIIa + 10% $NaHSO_4$ | 0.235 | |

Analytical Procedures

Accelerated Oxygen Absorbance Test—Polymer Samples

Bottle sidewall samples of the iron-containing compositions are cut to a predetermined size with a template and the sidewall sample weights are recorded to the nearest 0.01 g. The samples are placed into 20 ml gas chromatograph vials. The vials are either analysed dry or with activation. Activated (wet) samples are activated by placing 2 ml of aqueous 0.001 M acetic acid into the vial prior to being crimp sealed. The sidewall samples are stored at 50° C. The individual vials are analysed by gas chromatography for consumption of oxygen vs. a control at the prescribed time interval.

Intrinsic Viscosity

The intrinsic viscosity of intermediate molecular weight and low crystalline poly(ethylene terephthalate) and related polymers which are soluble in 60/40 phenol/tetrachloroethane was determined by dissolving 0.1 grams of polymer or ground pellet into 25 ml of 60/40 phenol/tetrachloroethane solution and determining the viscosity of the solution at 30° C.+/−0.05 relative to the solvent at the same temperature using a Viscotek viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 grams of polymer or ground pellet into 25 ml of 50/50 trifluoroacetic Acid/Dichloromethane and determining the viscosity of the solution at 30° C.+/−0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is IV in 60/40 phenol/tetrachloroethane=0.8229×IV in 50/50 trifluoroacetic Acid/Dichloromethane+ 0.0124

The Hunter Haze and Colour Measurement

The measurements were taken through the bottle sidewalls. A HunterLab Color QUEST Sphere Spectrophotometer System equipped with an IBM PS/2 Model 50Z computer, assorted specimen holders, and green, gray and white calibration tiles, and light trap was used. The HunterLab Spectrocolorimeter integrating sphere sensor is a color and appearance measurement instrument. Light from the lamp is diffused by the integrating sphere and either passed through (transmitted) or reflected (reflectance) off an object to a lens. The lens collects the light and directs it to a diffraction grating that disperses it into its component wave lengths. The dispersed light is reflected onto a silicon diode array. Signals from the diodes pass through an amplifier to a converter and are manipulated to produce the data. Haze data is provided by the software. It is the calculated ratio of the diffuse light transmittance to the total light transmittance multiplied by 100 to yield a "Haze %" (0% being a transparent material, and 100% being an opaque material). Samples prepared for either transmittance or reflectance must be clean and free of any surface scratches or abrasion. The size of the sample must be consistent with the geometry of the sphere opening and in the case of transmittance; the sample size is limited by the compartment dimension. Each sample is tested in four different places, for example on the bottle sidewall or representative film area.

A Panametrics Magna-Mike 8000 Hall Effect Thickness Gauge was employed to measure the bottle sidewall thickness.

What is claimed is:

1. An oxygen-scavenging composition wherein said oxygen scavenging composition comprises oxidizable elemental metal particles in their 0 valence state, at least one water hydrolysable Lewis acid salt and/or its adducts, and at least one acidifying electrolyte, wherein the acidifying electrolyte comprises at least one solid compound that produces a pH less than 7 in a dilute aqueous solution and substantially disassociates into positive and negative ions in the presence of moisture.

2. The oxygen-scavenging composition of claim 1 wherein the oxidizable metal comprises iron.

3. The oxygen-scavenging composition of claim 1, wherein the water hydrolysable Lewis acid salt is selected from the group consisting of $AlCl_3$, $AlBr_3$, $FeCl_2$, $FeCl_3$ and $FeBr_2$.

4. The oxygen-scavenging composition of claim 1, wherein the water hydrolysable Lewis acid salt is $AllCl_3$.

5. The oxygen-scavenging composition of claim 1, wherein the acidifying electrolyte is selected from the group consisting of sulfamic acid, zinc sulfate, ferrous sulfate and sodium bisulfate.

6. The oxygen-scavenging composition of claim 5, wherein the water hydrolysable Lewis acid salt is selected from the group consisting of $AlCl_3$, $AlBr_3$, $FeCL_2$, $FeCl_3$ and $FeBr_2$.

7. The oxygen-scavenging composition of claim 5, wherein the water hydrolysable Lewis acid salt is $AlCl_3$.

8. The oxygen-scavenging composition of claim 1, wherein the acidifying electrolyte is selected from the group consisting of potassium bisulfate, ammonium bisulfate, ammonium sulfite, ammonium bisulfite, and sodium bisulfite.

9. The oxygen-scavenging composition of claim 8, wherein the water hydrolysable Lewis acid salt is selected from the group consisting of $AlCl_3$, $AlBr_3$, $FeCl_2$, $FeCl_3$ and $FeBr_2$.

10. The oxygen-scavenging composition of claim 8, wherein the water hydrolysable Lewis acid salt is $AlCl_3$.

11. The oxygen-scavenging composition of claim 1, wherein the water hydrolysable Lewis acid salt is $FeBr_3$.

12. The oxygen-scavenging composition of claim 11, wherein the acidifying electrolyte is selected from the group consisting of sulfamic acid, zinc sulfate, ferrous sulphate, sodium bisulfate, potassium bisulfate, ammonium bisulfate, ammonium sulfite, ammonium bisulfite, and sodium bisulfite.

13. The oxygen-scavenging composition of claim 11, wherein the acidifying electrolyte is sodium bisulfate.

* * * * *